United States Patent
Jones

(10) Patent No.: US 6,184,495 B1
(45) Date of Patent: Feb. 6, 2001

(54) METHOD AND HEATING APPARATUS FOR PREVENTING ICE DAMS ON A ROOF

(75) Inventor: Thaddeus M. Jones, Bremen, IN (US)

(73) Assignee: MSX, Inc., South Bend, IN (US)

(*) Notice: Under 35 U.S.C. 154(b), the term of this patent shall be extended for 0 days.

(21) Appl. No.: 09/430,661

(22) Filed: Oct. 29, 1999

(51) Int. Cl.[7] .................................................. H05B 1/00
(52) U.S. Cl. ........................ 219/213; 219/537; 392/437
(58) Field of Search .................................. 219/538, 213, 219/536, 537, 526; 392/435, 436, 437, 433; 338/306

(56) References Cited

U.S. PATENT DOCUMENTS

| | | | |
|---|---|---|---|
| 2,111,251 | * | 3/1938 | Spilsbury .............................. 219/213 |
| 2,523,353 | * | 9/1950 | Boester ................................. 392/435 |
| 3,095,491 | * | 6/1963 | Deacon ................................. 219/213 |
| 3,191,004 | * | 6/1965 | Hocker ................................. 392/435 |
| 3,277,273 | * | 10/1966 | Williams .............................. 392/435 |
| 3,438,069 | * | 4/1969 | Long .................................... 219/537 |
| 3,573,430 | * | 4/1971 | Eisler ................................... 219/538 |
| 3,691,343 | * | 9/1972 | Norman ................................ 219/213 |
| 3,725,638 | * | 4/1973 | Solin et al. ........................... 219/213 |
| 4,134,002 | * | 1/1979 | Stanford ............................... 219/213 |
| 4,425,497 | * | 1/1984 | Leary et al. .......................... 219/536 |
| 4,591,697 | * | 5/1986 | Lexer ................................... 392/433 |
| 4,769,526 | * | 9/1988 | Taouil .................................. 219/213 |
| 5,315,090 | * | 5/1994 | Lowenthal ........................... 219/213 |
| 5,391,858 | * | 2/1995 | Tourangeau et al. ................ 219/213 |
| 5,619,613 | * | 4/1997 | Otaki ................................... 392/437 |
| 5,763,858 | * | 6/1998 | Jones .................................... 219/213 |
| 5,878,533 | * | 3/1999 | Swanfeld, Jr. ....................... 219/213 |
| 5,900,178 | * | 5/1999 | Johnsen ................................ 219/213 |

* cited by examiner

Primary Examiner—Teresa Walberg
Assistant Examiner—Fadi H. Dahbour
(74) Attorney, Agent, or Firm—Taylor & Aust, P.C.

(57) ABSTRACT

A method prevents ice dams on an outside surface of a slanted roof of a building. The building has an outside wall. The roof extends over and beyond the outside wall in an outward direction. The method includes placing a first heating device between the roof and the outside wall. The heating device extends beyond the outside wall in the outward direction. Heat from the heating device is used to melt frozen precipitation on the outside surface of the roof.

14 Claims, 4 Drawing Sheets

METHOD AND HEATING APPARATUS FOR PREVENTING ICE DAMS ON A ROOF

BACKGROUND OF THE INVENTION

1. Field of the Invention

The present invention relates to deicing systems, and, more particularly, to a roof and gutter deicing system.

2. Description of the Related Art

Ice dams forming near the outer edges, or "eaves," of a roof and extending into the gutters are a significant source of damage to a building. Ice dams form when snow on an inner or middle section of a roof melts and the meltwater flows down to the outer section of the roof, where it then refreezes into ice. The heat from within the building conducts through the roof to melt the snow on the middle portion of the roof. However, the outer edge of the roof extends outwardly beyond the outside wall of the building, and therefore is not heated by the heat from within the building. Thus, the melted snow from the middle portion of the roof refreezes and accumulates on the outer edge portion of the roof and in the gutters, thereby forming ice dams. Another possible cause of ice dams is the heating of the dark shingles when exposed to sunlight. Snow on the roof slides down to the gutter, where it abuts the gutter, thaws and refreezes. The freezing of the meltwater eventually builds up into an ice dam.

Such ice dams are known to cause leaks in roofs by allowing water to enter underneath the shingles of the roof and expand upon refreezing, thereby forcing the shingle away from the other shingles on the roof. The weight of ice dams can also tear a gutter away from the roof and/or soffit, thereby requiring costly repairs.

It is known to attach a heater wire to the outside surface of the outer edge portion of the roof. The heater wire may also extend along the gutter and through the downspout in order to maintain an open drainage path for melting of the frozen precipitation.

A problem is that the zig zagging pattern of the heater wires on the surface of the roof is not aesthetically pleasing and tends to take away from the visual appeal of the building.

What is needed in the art is an apparatus for melting snow on the outer edge of a roof that is not visually detectable from the outside of the building.

SUMMARY OF THE INVENTION

The present invention provides an apparatus that can be attached adjacent to the inside surface of a roof. Although the apparatus is disposed within the building, it can melt snow on the outer surface of the roof, even beyond the outside walls of the building.

The invention comprises, in one form thereof, a method of preventing ice dams on an outside surface of a slanted roof of a building. The building has an outside wall. The roof extends over and beyond the outside wall in an outward direction. The method includes placing a first heating device between the roof and the outside wall. The heating device extends beyond the outside wall in the outward direction. Heat from the heating device is used to melt frozen precipitation on the outside surface of the roof.

An advantage of the present invention is that the heating apparatus is not visually detectable from outside of the building.

Another advantage is that the heating apparatus does not need to be removed during normal maintenance and/or repair of the roof.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
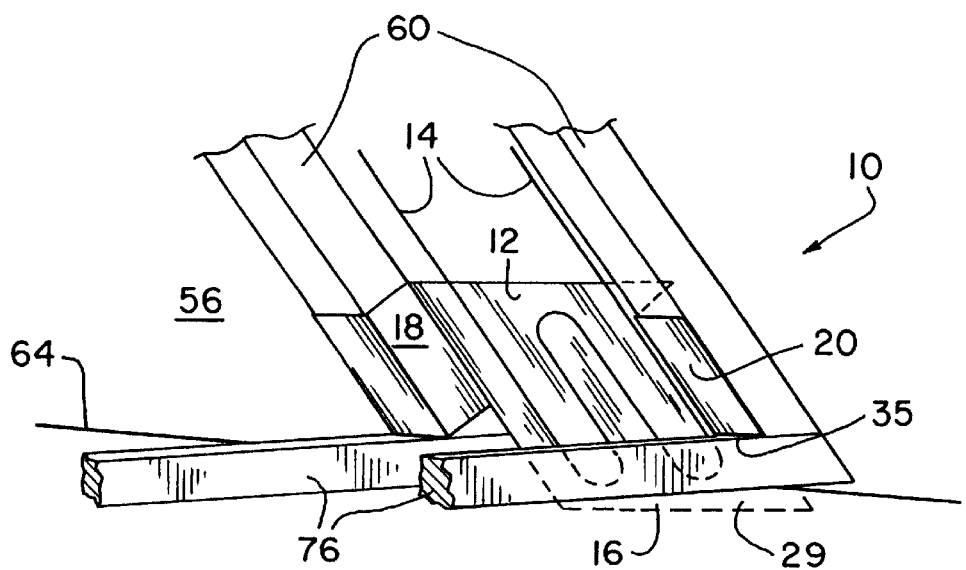
FIG. 1 is a perspective view of one embodiment of the snow melting apparatus of the present invention, mounted adjacent the inside surface of a roof.

Corresponding reference characters indicate corresponding parts throughout the several views. The exemplifications set out herein illustrates one preferred embodiment of the invention, in one form, and such exemplifications are not to be construed as limiting the scope of the invention in any manner.

DETAILED DESCRIPTION OF THE INVENTION

Referring now to the drawings, and particularly to FIG. 1, there is shown a snow melting apparatus 10 including a heat conduction device 12 and a heater wire 14.

Heat conduction device 12 is formed monolithically of at least one sheet of thermally conductive material, such as aluminum. Heat conduction device 12 includes a planar body portion 16, two planar side portions 18 and two planar wings 20.

Figure 2:
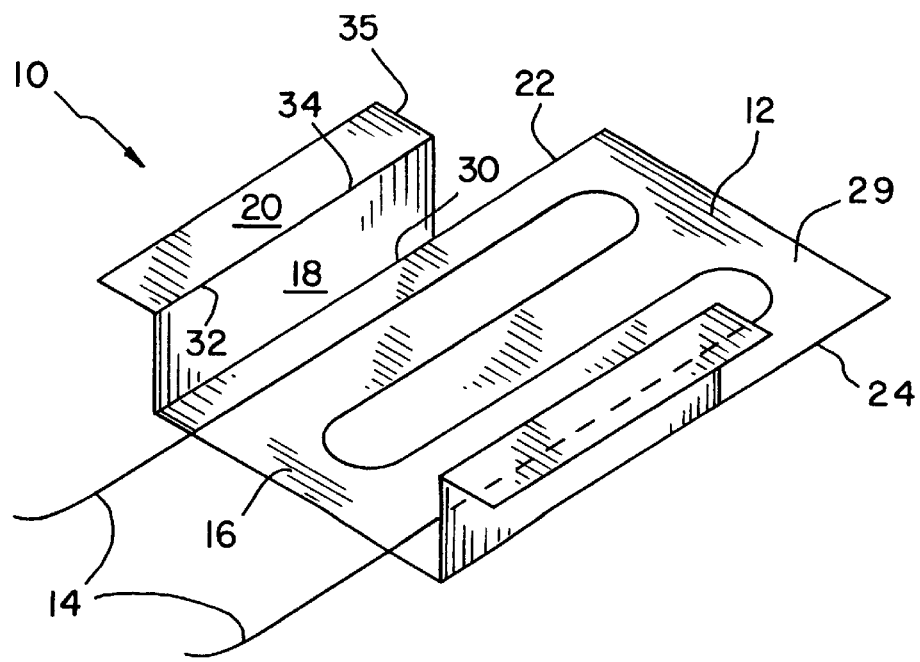
FIG. 2 is a perspective view of the snow melting apparatus of FIG. 1.
Figure 3:
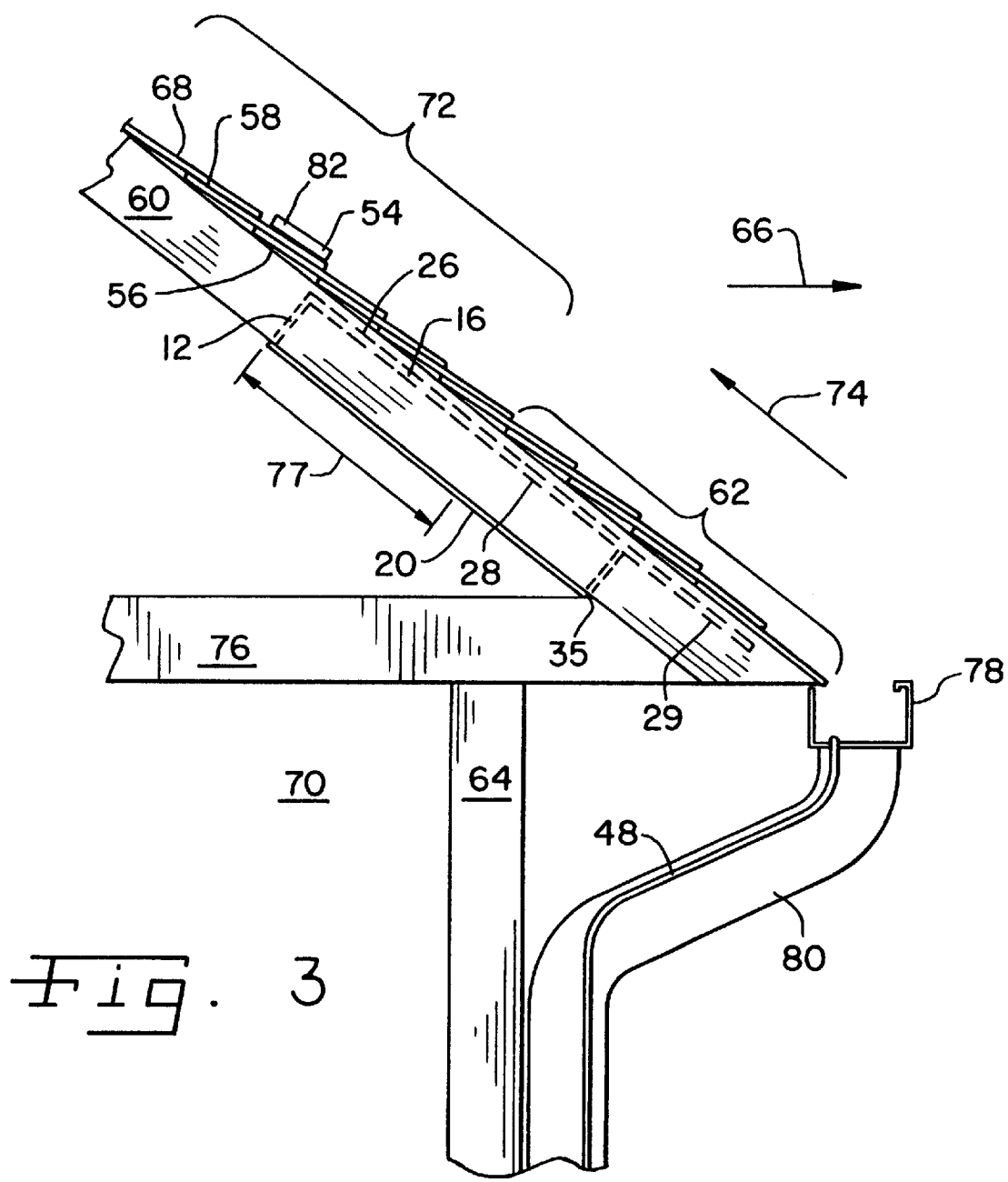
FIG. 3 is a cross-sectional view of another embodiment of the snow melting apparatus connected to a roof and to an associated gutter and downspout.

Body portion 16 has two opposite ends 22 and 24 (FIG. 2), a first side 26 (FIG. 3) and a second side 28. Side portions 18 extend perpendicularly from respective ends 22 and 24 of body portion 16 in a direction opposite or away from first side 26 of body portion 16. Body portion 16 has a distal part 29 which projects out from between side portions 18. Each side portion 18 has two opposite ends 30 and 32, with a first end 30 being attached to a respective one of ends 22 and 24 of body portion 16. Thus, heat conduction device 12 takes the shape of a "C-channel" heater.

Wings 20 extend perpendicularly and in opposite directions from respective ends 32 of respective side portions 18. A proximal end 34 of each wing 20 is attached to a respective end 32 of a respective side portion 18. Each wing 20 has a respective edge 35.

A first controller 36 (FIG. 4) selectively applies electrical current from a power supply 38 to heater wire 14. A receiver 40 connected to controller 36 can be used to receive an airborne signal, such as a radio frequency signal. The airborne signal, which is transmitted by a transmitter 42, indicates that operation of heater wire 14 is required, and that power from supply 38 should be applied thereto by controller 36. Antennas 44 and 46 are for receiving and transmitting, respectively, the airborne signal.

A second heater wire 48 has electrical current from a power supply 50 selectively applied thereto by a second controller 52. A sensor assembly 54 for sensing ambient precipitation and/or temperature is connected to controller 52.

Figure 5:
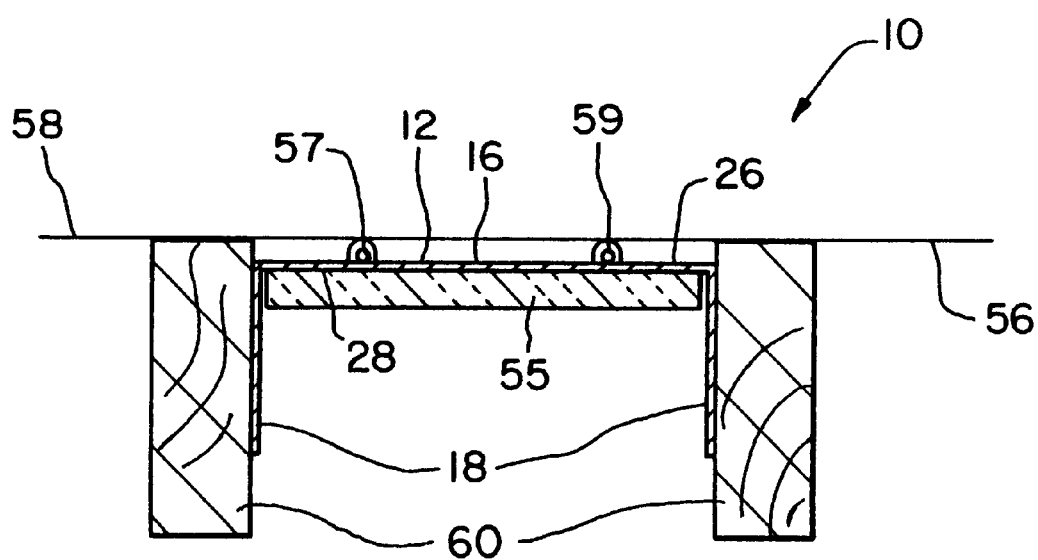
FIG. 5 is a cross-sectional view of another embodiment of the snow melting apparatus connected to a roof.

In another embodiment (FIG. 5), a layer of thermal insulation 55 is attached to second side 28 of body portion 16. In FIG. 5, heater wire 14 is shown as being attached directly to inside surface 56 of roof 58. Heater wire 14 is also attached to first side 26 of body portion 16, rather than to second side 28, as in FIGS. 1 and 2. Heater wire 14 can be seen to include a central conductor 57 surrounded by a layer of electrical insulation 59, such as polyvinylchloride.

During manufacture, heat conduction device 12 can be cut from a sheet of thermally conductive material, such as aluminum. Side portions 18 can be formed by bending the sheet aluminum along ends 22 and 24. Similarly, wings 20 can be formed by again bending the sheet aluminum along ends 32 of side portions 18. Heater wire 14 includes a core electrical conductor surrounded by a layer of electrically insulating material. Heater wire 14 is then attached, such as by stapling or bonding, to first side 26 or second side 28 of body portion 16 in a serpentine pattern.

During installation, the assembly formed of heat conduction device 12 and heater wire 14 is mounted adjacent to an inside surface 56 of a roof 58. If roofing nails have been used to attached the shingles of roof 58, then a gap should be maintained between inside surface 56 and the assembly formed of heat conduction device 12 and heater wire 14 in order to avoid the roofing nails touching heater wire 14. If the shingles are attached in another way, such as by stapling, then the assembly formed of heat conduction device 12 and heater wire 14 can directly engage and be attached to inside surface 56 of roof 58. The width of body portion 16 between ends 22 and 24 is such that heat conduction device 12 fits snugly between two parallel rafters 60 which are attached to inside surface 56 of roof 58. Side portions 18 and/or wings 20 can be attached to respective rafters 60, such as by stapling or nailing.

An outer edge section 62 of roof 58 extends over and beyond an outside wall 64 in an outward, horizontal direction, indicated by arrow 66. Outer edge section 62 is particularly subject to having ice dams form on its outside surface 68 because outer edge section 62 is not exposed to the heat within building 70 which rises up to heat an inner section 72 of roof 58 and melt the snow thereon. Thus, the melted snow tends to refreeze when it reaches outer edge section 62, thereby forming ice dams.

For the above reasons, heat conduction device 12 is placed such that it can heat as much as possible of inside surface 56 of outer edge section 62. After being inserted between rafters 60, heat conduction device 12 is slid along rafters 60 in a downward and outward direction, opposite to a direction of incline 74 of roof 58, until edges 35 of wings 20 engage respective horizontal cross beams 76 of building 70. Heat conduction device 12 is oriented such that distal part 29 of body portion 16 extends over and beyond outside wall 64. In this installed position, a length 77 by which body portion 16 extends in direction 74 from outside wall 64 can be approximately 12 inches.

Figure 4:
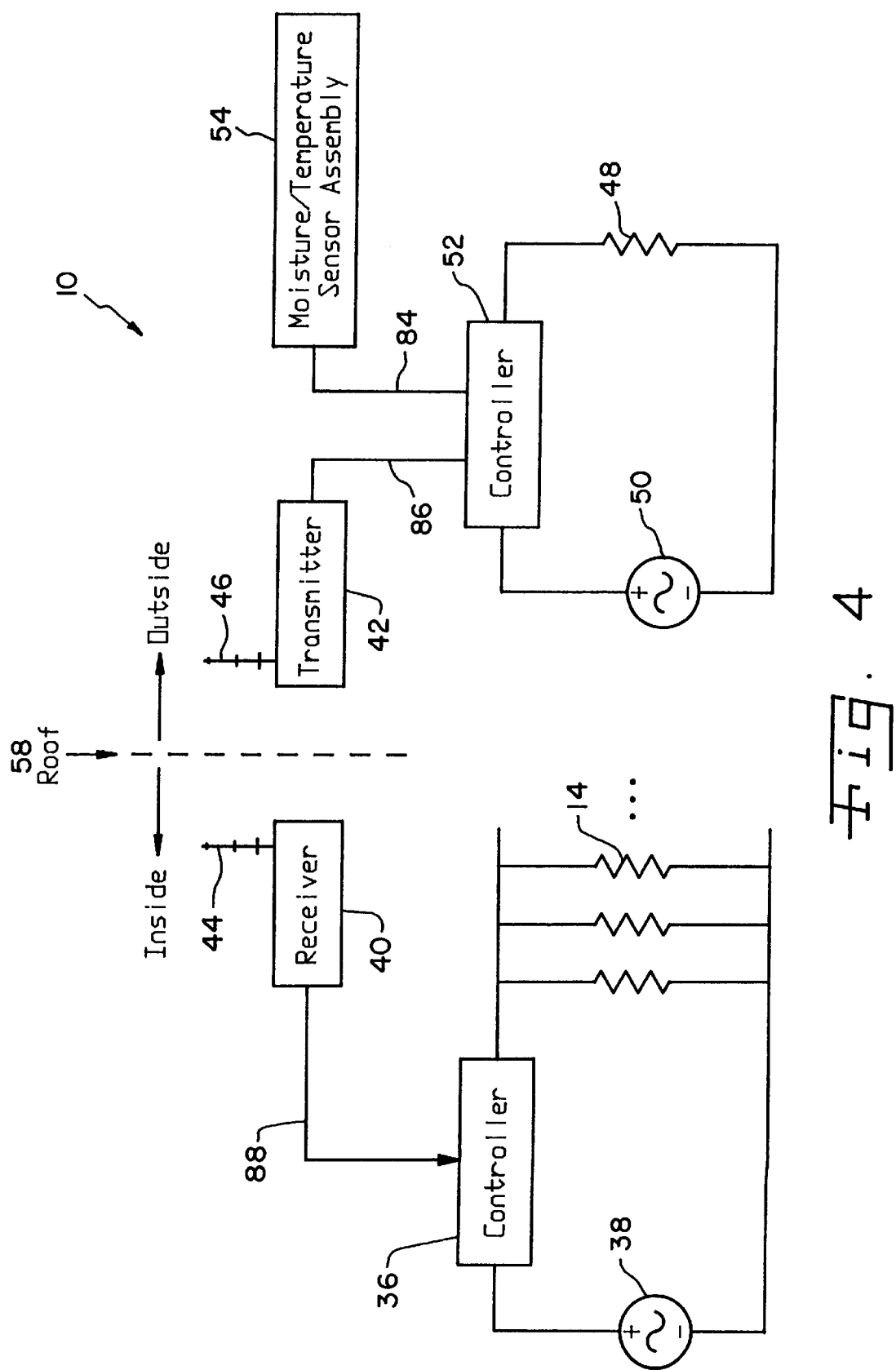
FIG. 4 is a schematic diagram of the snow melting apparatus of FIG. 3.

A separate heat conduction device 12 and associated heater wire 14 can be installed between each pair of parallel and adjacent rafters 60. As indicated in FIG. 4, heater wires 14 can be connected in parallel to power supply 38.

Heat wire 48 is placed in a gutter 78 and/or a downspout 80 attached to gutter 78. Controller 52, sensor assembly 54, transmitter 42 and antenna 46 can be all packaged in a common housing 82 which is installed on outside surface 68 of roof 58.

It is possible for sensor assembly 54 to include a plurality of moisture/temperature sensors installed at different locations on outside surface 68. Each of the sensors can be connected to a common controller 52 in an "or" configuration. That is, it is only necessary for one of the sensors to sense an ambient temperature below a predetermined level and/or the presence of ambient precipitation in order for controller 52 to call for heat from heaters 14 and 48.

During use, when sensor assembly 54 senses an ambient temperature below a predetermined level, such as 38° F., and/or the presence of ambient precipitation, a signal is transmitted to controller 52 on line(s) 84. Upon receiving this signal, controller 54 connects power supply 50 to heater wire 48, thereby causing heater wire 48 to dissipate heat. The heat is then conductively transferred to gutter 78 and/or downspout 80, ensuring a drainage path for any water within gutter 78. Controller 52 also transmits a signal on line 86 which, in turn, causes transmitter 42 to transmit an airborne signal from antenna 46. The airborne signal has a frequency of approximately between 200 MHz and 400 MHz. In order to avoid interfering with other devices which operate in this frequency range, such as garage door openers, the airborne signal can be transmitted for only a short interval of time, such as for less than 15 seconds within any one hour time interval. Heater wires 14 and 48 can continue to operate for up to approximately 1.5 hours after the termination of the air-borne signal.

When antenna 44 of receiver 40 receives the airborne signal, a signal is transmitted from receiver 40 to controller 36 on line 88, indicating that the airborne signal has been received. As indicated in FIG. 4, the airborne signal is transmitted from the outside of building 70 through roof 58 and to the inside of building 70, i.e., to antenna 44, receiver 40 and controller 36. Upon receiving the signal on line 88, controller 36 interconnects power supply 38 with one or more of heaters 14. The operation of heaters 14 can be dependent upon the operation of heaters 48. For instance, heaters 14 can be operated for a longer period of time than are heaters 48.

The heat from heaters 14 is dispersed by heat conduction device 12 throughout the entire body portion 16. The heat within body portion 16 is then transferred by conduction to inside surface 56. The heat then conducts to roof 58 and to its outside surface 68. As outside surface 68 heats up, it melts any ice or snow which falls or has accumulated thereon. The melted snow and ice then drains into gutter 78 and flows down downspout 80. Controllers 36 and 52 can shut off heaters 14 and 48, respectively, after respective periods of time after the start of operation. For example, controller 36 can stop operation of heaters 14 after approximately 1 hour.

Heater wire 14 has been shown as being attached to either first side 26 or second side 28 of body portion 16. However, it is to be understood that heater wire 14 can also be embedded within body portion 16.

Side portions 18 and wings 20 have been shown as being formed of a thermally conductive material. However, it is to be understood that sides 18 and wings 20 can also be formed of a non-thermally conductive material in order to avoid conducting heat away from inside surface 56 of roof 58. Alternatively, it is possible to place a layer of thermally insulative material between rafters 60 and side portions 18 and/or wings 20.

Wings 20 have been shown as being attached to an inside surface of a rafter 60, i.e., to a surface facing the inside of building 70. However, it is to be understood that it is possible for heat conduction device 12 be a planar, unbent sheet, with wings attached to respective outside surfaces of rafters 60, i.e., to surfaces facing and possibly in contact with roof 58.

Controller 52 has been described as being located on outside surface 68 of roof 58. However, it is also possible for the heating apparatus to be controlled by a single controller located within building 70. The single controller could be hard wired to a moisture and/or temperature sensor located outside building 70.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A snow-melting apparatus for preventing ice dams on an outside surface of a roof of a building, an outer edge section of the roof extending over and beyond an outside wall of the building in an outward direction, the roof having a direction of incline, a plurality of elongate rafters being attached to an inside surface of the roof, at least two of said rafters extending substantially parallel to each other and to the direction of incline of the roof, said apparatus comprising:

a heat conduction device comprising:

a substantially planar body portion formed of a substantially thermally conductive material and having two opposite ends, a first side and a second side, said second side being opposite said first side, said first side being configured for contacting and transferring heat to the inside surface of at least the outer edge section of the roof; and two substantially planar side portions extending from said body portion, each said side portion having two opposite ends, a first of said ends being attached to a respective said opposite end of said body portion, said side portions being configured for at least one of simultaneously engaging and being simultaneously connected to respective ones of two adjacent said parallel rafters; and a heat source attached to said body portion of said heat conduction device.

2. A snow-melting apparatus for preventing ice dams on an outside surface of a roof, said apparatus comprising:

a heater wire arranged in a serpentine pattern, said heater wire being configured for being attached to an inside surface of the roof; and a power supply electrically connected to said heater wire.

3. The snow-melting apparatus of claim 2, further comprising an outside wall associated with the roof, said outside wall defining an inside area and an outside area, at least a portion of said heater wire being disposed within said inside area.

4. A snow-melting apparatus for preventing ice dams on an outside surface of a roof of a building, an outer edge section of the roof extending over and beyond an outside wall of the building in an outward direction, the roof having a direction of incline, a plurality of elongate rafters being attached to an inside surface of the roof, at least two of said rafters extending substantially parallel to each other and to the direction of incline of the roof, said apparatus comprising:

a heat conduction device comprising:

a substantially planar body portion formed of a substantially thermally conductive material and having two opposite ends, a first side and a second side, said second side being opposite said first side, said first side being configured for contacting and transferring heat to the inside surface of at least the outer edge section of the roof; and two substantially planar side portions extending orthogonally from said body portion in a direction substantially opposite said first side of said body portion, each said side portion having two opposite ends, a first of said ends being attached to a respective said opposite end of said body portion, said side portions being configured for at least one of simultaneously engaging and being simultaneously connected to respective ones of two adjacent said parallel rafters; and a heat source attached to said second side of said body portion of said heat conduction device.

5. The apparatus of claim 4, wherein a height of said side portions between said two opposite ends is approximately equal to a height of said rafters, said heat conduction device includes two substantially planar wings, each said wing extending orthogonally from a respective said side portion, said wings extending in substantially opposite directions from said side portions, each said wing having a proximal end attached to a second of said ends of said respective side portion, each said wing being configured for being attached to a respective one of said two adjacent parallel rafters, each said wing having an edge configured for engaging a respective, substantially horizontal cross beam of said building.

6. The apparatus of claim 4, wherein the roof has an inner section disposed on an opposite side of the outside wall from the outer edge section, said first side of said body portion of said heat conduction device being configured for contacting and transferring heat to the inside surface of the inner section of the roof.

7. The apparatus of claim 6, wherein said first side of said body portion of said heat conduction device is configured for extending approximately 12 inches inward from the outside wall along the inner section of the roof.

8. A snow-melting apparatus for preventing ice dams on an outside surface of a roof of a building, an outer edge section of the roof extending over and beyond an outside wall of the building in an outward direction, the roof having a direction of incline, a plurality of elongate rafters being attached to an inside surface of the roof, at least two of said rafters extending substantially parallel to each other and to the direction of incline of the roof, said apparatus comprising:

a heat conduction device comprising:

a substantially planar body portion formed of a substantially thermally conductive material and having two opposite ends, a first side and a second side, said second side being opposite said first side, said first side being configured for contacting and transferring heat to the inside surface of at least the outer edge section of the roof; and two substantially planar side portions extending orthogonally from said body portion in a direction substantially opposite said first side of said body portion, each said side portion having two opposite ends, a first of said ends being attached to a respective said opposite end of said body portion, said side portions being configured for at least one of simultaneously engaging and being simultaneously connected to respective ones of two adjacent said parallel rafters;

a heat source attached to said first side of said body portion of said heat conduction device; and a layer of thermal insulation attached to said second side of said body portion of said heat conduction device.

9. A snow-melting apparatus for preventing ice dams on an outside surface of a roof, a plurality of elongate rafters being attached to an inside surface of the roof, at least two of said rafters extending substantially parallel to each other and to a portion of the roof to which the parallel rafters are attached, said apparatus comprising:

a heat conduction device formed of a substantially thermally conductive material, said heat conduction device extending between and being connected to two adjacent said parallel rafters, a planar portion of said heat conduction device being disposed below, substantially parallel to, and closely adjacent said inside surface of the roof, said planar portion also being disposed above an underside of at least one of said two adjacent parallel rafters; and a heat source attached to said heat conduction device.

10. The apparatus of claim 9, wherein said heat conduction device includes:

a substantially planar body portion having a first side and a second side, said second side being opposite said first side, said first side being configured for directly engaging and transferring heat to the inside surface of the roof, said body portion having two opposite ends; and two substantially planar side portions extending orthogonally from said body portion in a direction substantially opposite said first side of said body portion, each said side portion having two opposite ends, a first of said ends being attached to a respective said opposite end of said body portion, each said side portion being configured for at least one of engaging and being connected to a respective one of said two adjacent parallel rafters.

11. The apparatus of claim 10, wherein each said side portion is configured for being directly attached to said respective rafter.

12. The apparatus of claim 10, wherein said heat source comprises an electrically insulated heating wire.

13. The apparatus of claim 10, wherein said heat conduction device is monolithic, said thermally conductive material comprising aluminum.

14. A snow-melting apparatus for preventing ice dams on an outside surface of a roof, a plurality of elongate rafters being attached to an inside surface of the roof, at least two of said rafters extending substantially parallel to each other and to a portion of the roof to which the parallel rafters are attached, said apparatus comprising:

a heat conduction device formed of a substantially thermally conductive material, said heat conduction device extending between and being connected to two adjacent said parallel rafters, adjacent said inside surface of the roof, said heat conduction device including:

a substantially planar body portion having a first side and a second side, said second side being opposite said first side, said first side being configured for engaging and transferring heat to the inside surface of the roof, said body portion having two opposite ends;

two substantially planar side portions extending orthogonally from said body portion in a direction substantially opposite said first side of said body portion, each said side portion having two opposite ends, a first of said ends being attached to a respective said opposite end of said body portion, each said side portion being configured for at least one of engaging and being connected to a respective one of said two adjacent parallel rafters; and two substantially planar wings, each said wing extending orthogonally from a respective said side portion, said wings extending in substantially opposite directions from said side portions, each said wing having a proximal end attached to a second of said ends of said respective side portion, each said wing being configured for being attached to a respective one of said two adjacent parallel rafters; and a heat source attached to said heat conduction device.

* * * * *

UNITED STATES PATENT AND TRADEMARK OFFICE
CERTIFICATE OF CORRECTION

PATENT NO. : 6,184,495 B1
DATED : February 6, 2001
INVENTOR(S) : Thaddeus M. Jones It is certified that error appears in the above-identified patent and that said Letters Patent is hereby corrected as shown below:

<u>Column 5,</u>
Line 32, delete "being configured for" therefor.
Line 45, delete "A" and substitute -- The -- therefor.
Line 46, delete "said apparatus" and substitute -- of claim 1, further -- therefor.

Signed and Sealed this

Seventh Day of August, 2001

*Attest:*

NICHOLAS P. GODICI
*Attesting Officer*     *Acting Director of the United States Patent and Trademark Office*